US007008686B1

(12) United States Patent
Rogers

(10) Patent No.: US 7,008,686 B1
(45) Date of Patent: Mar. 7, 2006

(54) PLASTIC PADS, FOR PLACEMENT BETWEEN EQUIPMENT AND ITS SUPPORT

(76) Inventor: Melissa B. Rogers, 309 Foreman Dr., Lafayette, LA (US) 70506

( * ) Notice: Subject to any disclaimer, the term of this patent is extended or adjusted under 35 U.S.C. 154(b) by 0 days.

(21) Appl. No.: 10/613,680

(22) Filed: Jul. 3, 2003

Related U.S. Application Data

(60) Provisional application No. 60/395,522, filed on Jul. 11, 2002.

(51) Int. Cl.
*B32B 1/00* (2006.01)
*F16M 13/00* (2006.01)
*E04B 1/62* (2006.01)

(52) U.S. Cl. .......................... 428/178; 428/33; 428/58; 428/116; 428/192; 248/633; 248/634; 52/393

(58) Field of Classification Search .................. 428/58, 428/156, 167, 178, 120, 192, 33, 116; 52/396.06, 52/403.1, 716.1, 717.05, 393; 248/49, 55, 248/60, 345.1, 560, 615, 633, 634, 609; 293/110, 293/132, 136; 404/64, 68
See application file for complete search history.

(56) References Cited

U.S. PATENT DOCUMENTS 3,871,636 A * 3/1975 Boyle ......................... 267/140
4,788,777 A * 12/1988 Davis .......................... 34/239
5,266,378 A * 11/1993 Stephenson et al. ........ 428/156
5,681,416 A * 10/1997 Neumann et al. ........ 156/304.5
5,972,475 A * 10/1999 Beekman .................... 428/167

OTHER PUBLICATIONS

Author unknown; internet website pages for "Bat Wing Plastics" Plastic Pipe Support advertisement; publication date unknown.
Author unknown; internet website page for "Bat Wing Plastics" "Moon Support" solid plastic pipe supports; publication date unknown.
Author unknown; internet website page for "Bat Wing Plastics" "Sleeve Supports with Optional Wear Pads"; publication date unknown.
Author unknown; advertisement for "Solid FRP Half Rounds"; Glas Mesh Co.; publication date unknown.

* cited by examiner

*Primary Examiner*—Donald J. Loney
(74) *Attorney, Agent, or Firm*—Jesse D. Lambert

(57) ABSTRACT

A non-metallic pad for placement between equipment and its support, for example between a pipe and a beam supporting the pipe. The pad comprises an elongated main body, preferably having male and female dovetails on either end to permit connecting multiple pads together. In profile, the main body has a convex top and a flat bottom. The main body is of a lattice internal structure, with the ribs of the lattice running substantially vertically. The ribs terminate at one end against a closed top surface, and at the other end terminate at a common level to form an open bottom. Injection molding is preferably used to form the pad. Preferred non-metallic materials for the pad are plastics, including glass fiber filled polyurethane, glass fiber filled nylon, and rubber filled polypropylene.

14 Claims, 4 Drawing Sheets

TOP VIEW

ISOMETRIC SECTION AT B

PLASTIC PADS, FOR PLACEMENT BETWEEN EQUIPMENT AND ITS SUPPORT

CROSS-REFERENCE TO RELATED APPLICATIONS

This application claims priority to provisional patent application Ser. No. 60/395,522, filed Jul. 11, 2002.

BACKGROUND

1. Field of Art

This invention relates to products used in connection with equipment installations in general. With more particularity, the invention relates to a type of plastic pad adapted to be disposed between equipment and its support; for example, between a pipe and a support on which the pipe rests, for example a beam, or between equipment such as a pump or compressor and the floor supporting it.

2. Related Art

In industrial settings, by way of example only (and not limitation) such as plants, refineries and the like, there is much equipment which is obviously supported by other structure, by floors, etc. In particular, in many settings there are many pipes which must be supported by beams, the beams being spaced apart and running generally transverse to the longitude of the pipe. It is desirable to have some sort of pad placed between the pipe and the beam, which holds the pipe up off the beam, to prevent water and other liquids from collecting between the pipe and the beam and creating a concentrated point of possible corrosion. Such pads serve other purposes as well; for instance, the pads can act as vibration dampeners/absorbers to prevent the damaging effects of long-term vibration between the pipe and the support.

Other types of equipment besides pipes are frequently disposed on some sort of pad. In particular, reciprocating or rotating equipment such as pumps and compressors can generate considerable vibration, and a resilient pad between the equipment and a floor on which it rests is desirable.

Turning to support pads for pipe, prior art support pads have often been of relatively crude construction, such as blocks of wood. Materials like wood are obviously prone to decay, and in fact tend to absorb and hold liquids against the pipe. Other pads have been fabricated of various plastic materials, but have generally been of solid cross section construction. Solid construction for plastic members is inefficient, in the sense that more material is used than is actually needed to achieve the required strength, etc. for the pad. Since, for plastic elements, the cost of the finished product is largely dependent on the weight of the material incorporated therein, a more efficient structure is more cost efficient. Examples would include products having a lattice internal structure. In addition, when used on plastic parts, lattice structures exhibit superior strength arising from certain properties of molded and cured plastics, such strength characteristics not present in a solid structure.

Similar considerations exist for equipment other than pipes, such as pumps, compressors, etc.

SUMMARY OF THE INVENTION

The present invention comprises an injection molded plastic pad for placement between equipment and its support, especially although not exclusively between a pipe and its support. The pad has sufficient compressive strength to support a pipe, yet comprises an internal lattice structure which reduces the volume and weight of material used to form the pad. The pad is elongated, preferably with a cross sectional profile comprising a substantially flat bottom edge and a rounded or "crowned" top edge. In some embodiments, each pad may have male and female dovetail "ears" on either end; such dovetails on adjacent pads are adapted to fit one into the other and permit linking a number of pads together. Preferably, a cavity and plug injection molding process is employed to form the pad, and which is particularly suitable for forming the lattice internal structure of the pad. Various lattice configurations may be used. Different non-metallic, plastic materials can be used to form the pad, including but not limited to glass fiber filled polyurethane (referred to in the market as a "filled TPU," which acronym refers to a "thermoset polyurethane"); a glass fiber filled nylon; and a rubber filled polypropylene. The material selection can be tailored to suit the desired application. Each material generally is commercially available in pelletized form, which is used as feedstock to the injection molding process, as is well known in the art.

DESCRIPTION OF THE PRESENTLY PREFERRED EMBODIMENT

While the present invention could be used to support different types of objects on a base or support, as a matter of convenience and for the illustrative purpose of setting out some of the presently preferred embodiments of the invention, use of the invention in a typical pipe support setting will be described. It is understood that the present invention is equally applicable for placement between other types of equipment, such as compressors, pumps, etc. and the surface which supports the equipment.

Figure 1:
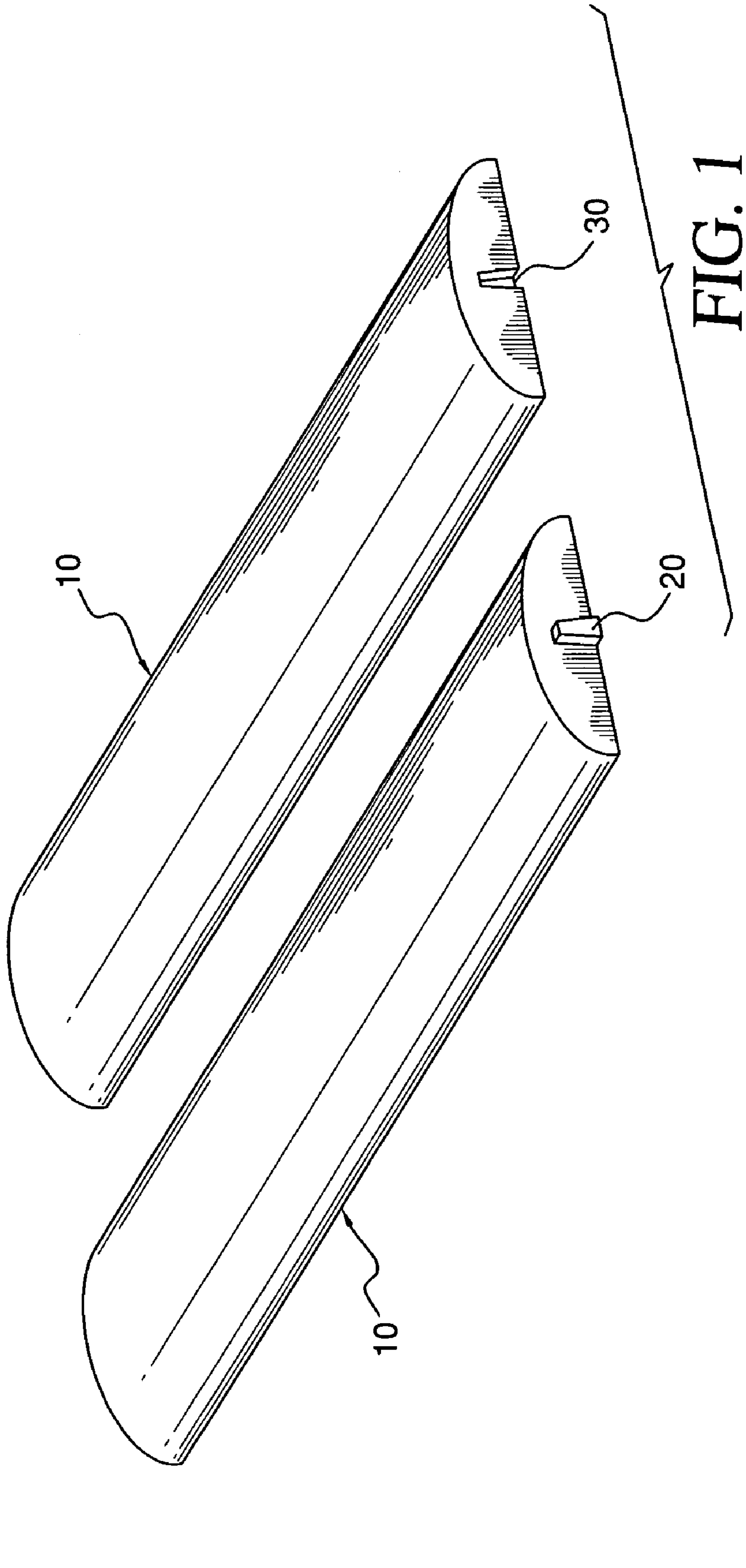
FIG. 1 is a perspective view of the pads of the present invention, showing both the male and female dovetails.
Figure 3:
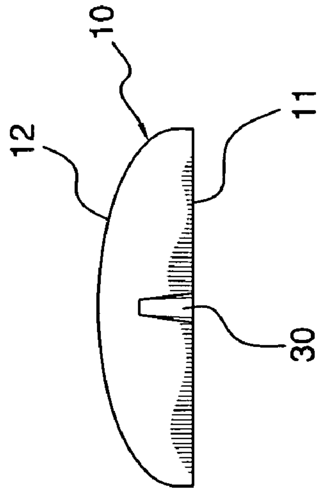
FIG. 3 is an end view, showing the female dovetail.
Figure 2:
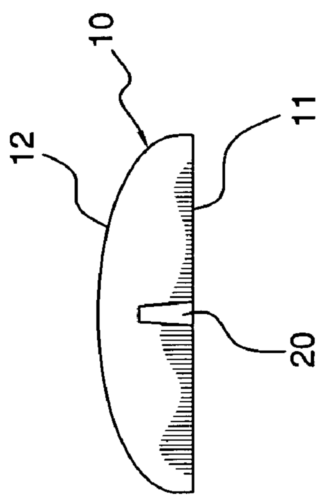
FIG. 2 is an end view, showing the male dovetail.
Figure 4:
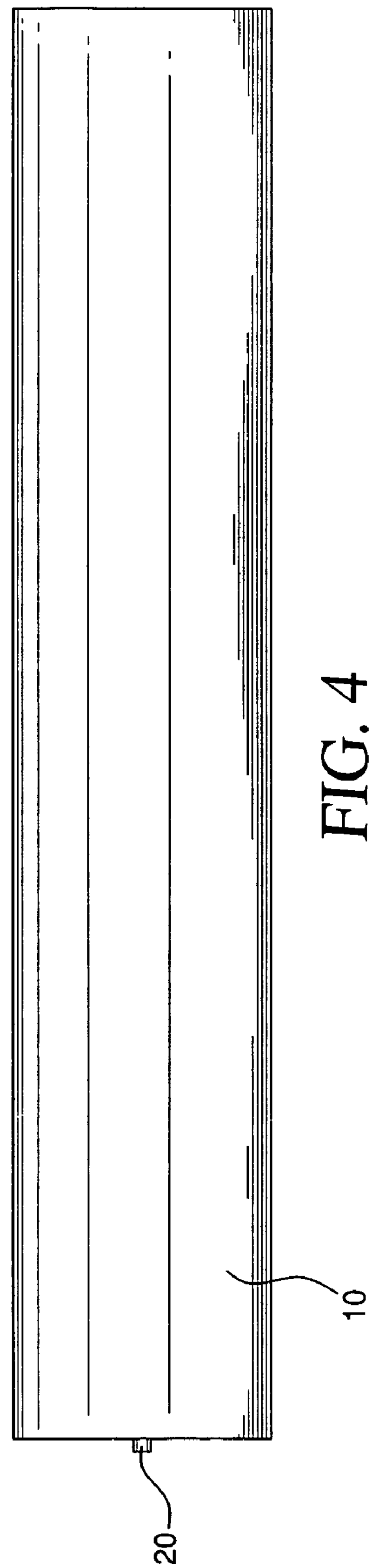
FIG. 4 is a top view.

The invention comprises, in a presently preferred embodiment, an elongated pad as seen in perspective view in FIG. 1, which shows a pair of the pads 10 with two different ends shown (male and female dovetails). In cross-section or end view, in a plane substantially transverse to a primary axis of the pad (here, along the axis of elongation), as best seen in FIGS. 2 and 3, pad 10 has an open, substantially flat bottom 11 and a closed, "crowned" or convex top 12 (that is, convex away from the central body of the pad). The flat bottom 11 provides a large bearing area on the support (for example, a beam), while the convex top tends to cause liquids to flow off of, rather than pool on, the top surface. Additionally, the convex top results in a more nearly line or point contact as between the pipe and the pad, further reducing the potential area for liquid to be trapped between the pipe and the pad. This reduces the likelihood of corrosion.

It is understood that while a presently preferred embodiment is elongated in one direction, it is possible for other embodiments of the invention to be more nearly equilateral (e.g. square), or even circular, when viewed from above.

Such embodiment would retain a primary axis along which the above-described cross section shape would exist.

Figure 6:
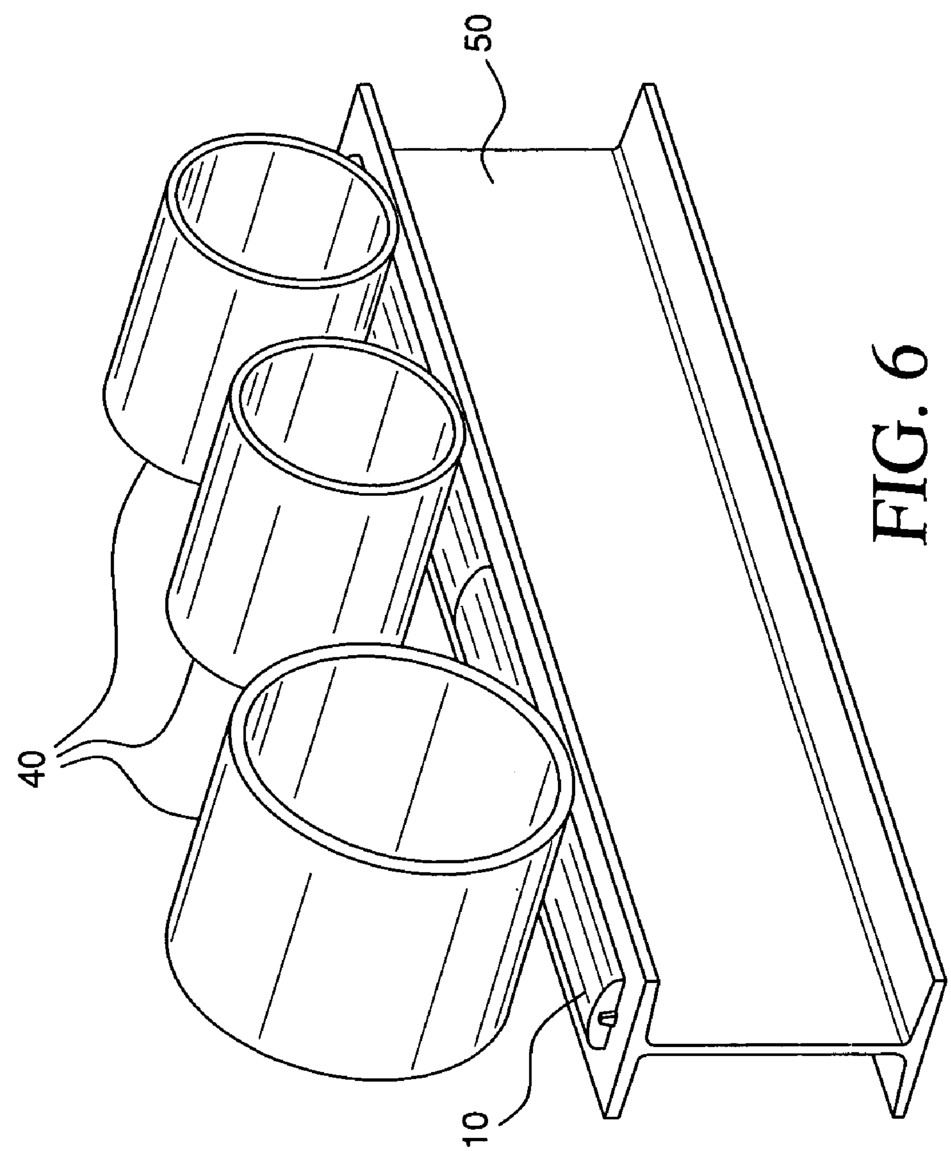
FIG. 6 shows the pad in place between equipment and its support, in the illustrated example between pipes and a supporting beam.

In some embodiments, each pad may have male and female dovetail shapes 20 and 30 respectively on either end. Such shapes on multiple, adjacently placed pads fit one into the other and permit linking a number of the pads together, as can be seen in FIG. 6.

Figure 5:
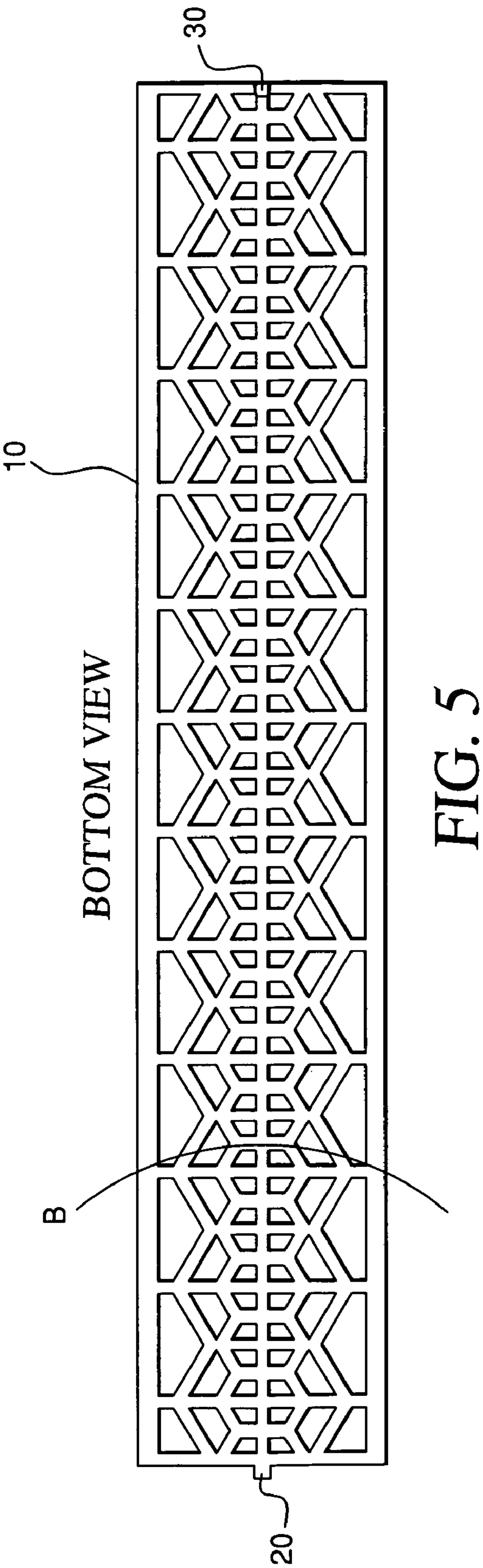
FIG. 5 is a bottom view, showing the lattice structure.
Figure 5A:
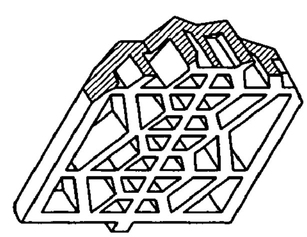
FIG. 5A is an isometric view at section B on FIG. 5.

As can be seen in FIG. 5, which is a bottom view of pad 10, and FIG. 5A, which is an isometric cross section at B in FIG. 5, the preferred embodiment of the invention comprises a ribbed, lattice type internal structure, which is created in the injection molding process by a cavity and plug molding process. Fundamentally, the lattice comprises a plurality of ribs, which run substantially vertically; that is, from top to bottom of the pad. This alignment of the ribs places them substantially parallel to the force exerted by the weight of a pipe or other equipment being supported. As is seen in FIG. 5, the ribs terminate at the bottom surface or boundary, forming an open bottom. An important benefit to the lattice structure of the pad is that it provides high strength with respect to vertical loads, because the lattice is a vertically stiff structure, yet yields the strength in an efficient manner in the sense that a relatively small volume and consequently weight of molded material is needed to create the pad.

The injection molding process to create the pad of the present invention, having a lattice structure, with an open bottom and convex, closed top, is generally known in the injection molding field. While those having skill in the art of injection molding can readily appreciate how such molding would be accomplished, generally a two part mold comprising a female cavity and male plug is used. The male plug is placed within the female cavity, and a plastic is injected under pressure and temperature so as to fill the voids left between the mating mold parts. Injection rates, pressures, temperatures and the like can be varied as required by materials, etc. After a cure period within the mold, the mold is opened and the molded pad is ejected.

The lattice type structure, in an injection molded plastic part, yields yet another beneficial result. Increasing the surface area in a molded plastic part (in the present invention, surface area is greatly increased due to the lattice structure) increases average tensile strength per cross sectional unit area of the material. This effect is due to the manner in which plastics cure and develop tensile strength, where maximization of surface area maximizes tensile strength. Various lattice configurations could be used, in terms of size and number of ribs, placement of ribs, etc. The resulting benefit is a pad having a greater compressive load capacity than a solid pad of similar dimensions, while requiring substantially less material to form the pad.

In a presently preferred embodiment, each pad is roughly 12 inches long, 2 inches wide, with a thickness measured from the bottom to the peak of the top surface of about ½ inch. However, these dimensions are offered by way of example only, and it is understood that various dimensions could be made to suit different applications, including the roughly "square" or circular embodiments previously described herein.

An exemplary manner of installing the pad will now be described, in conjunction with one application, that being placed between a pipe and a support such as a beam. As best described in conjunction with FIG. 6, pipe 40 and support beam 50 are separated a sufficient distance to insert pad 10 between pipe 40 and support beam 50, and pipe 40 is then lowered in place atop pad 10. While many applications do not require fixing of the pad to the support beam (other than by the weight of the pipe which it is supporting), the pad is commonly fixed to the support beam by an adhesive such as epoxy. While the exemplary installation in FIG. 6 shows the pad being disposed substantially at right angles to the longitude of the pipe, it is understood that the pad could be installed at other angles, including substantially parallel to the longitude of the pipe.

Different materials can be used to form the pad. Broadly speaking, a variety of non-metallic materials, namely plastics, can be used. Suitable plastic materials comprise both thermoplastic and thermosetting materials, of elastomeric or polymeric form. Three materials which are presently preferred (each having particular suitability for different applications) are a glass fiber filled polyurethane (referred to in the market as a "filled TPU," which acronym refers to a "thermoset polyurethane"), which is especially suited for the anti-corrosion application of the pad; a glass fiber filled nylon, especially suitable for high heat resistance/non-flammable applications; and a rubber filled polypropylene (commercially available in a 25% rubber/75% polypropylene mix, by volume), especially suitable for vibration dampening. Each material generally is commercially available in pelletized form, which is used as feedstock to the injection molding process as is well known in the art. It is to be noted that plastic materials exhibit the beneficial characteristics of being highly decay resistant, and non-absorbent of corrosive liquids.

The lattice type structure, combined with the preferred materials, forms a high strength pad. Typical load strengths are 27,000 psi tensile strength for the glass fiber filled polyurethane ("TPU"); 16,000 psi for the glass fiber filled nylon; and 12,000 psi for the rubber filled polypropylene.

While the description set out above includes many specificities, it is to be understood that these are provided in order to describe some of the presently preferred embodiments of the invention, and are not limitations on the scope of the invention. Persons having skill in the relevant art field will recognize that various changes could be made to the disclosed embodiments without departing from the spirit of the invention. For example, different non-metallic materials could be used; dimensions could be changed to suit particular applications, including embodiments which are substantially square or circular when viewed from above; the particular shape of the lattice structure can be varied; placement with respect to the equipment being supported and the support can be changed; and other changes recognized by those skilled in the relevant art field.

Therefore, the scope of the invention is to be measured not by the above description, but by the appended claims and their legal equivalents.

I claim:

1. A pad for placement between a pipe and a surface supporting the pipe, comprising:

a main body, with a profile shape in a plane transverse to its primary axis comprising a convex top and a substantially flat bottom, said convex top being closed and said flat bottom being open, and wherein said main body comprises a lattice internal structure comprising a plurality of ribs oriented substantially vertically when said bottom is substantially horizontal, said ribs running from said bottom to said top, wherein said plurality of ribs forms a lattice, comprising ribs which are substantially parallel to said primary axis of said main body, ribs which are substantially perpendicular to said primary axis of said main body, and ribs which are at an acute angle to said primary axis, and wherein said main body is formed of a plastic material via injection molding.

2. The pad of claim 1, wherein said plastic material is glass fiber filled polyurethane.

3. The pad of claim 1, wherein said plastic material is glass fiber filled nylon.

4. The pad of claim 1, wherein said plastic material is rubber filled polypropylene comprising 25% rubber/75% polypropylene by volume.

5. The pad of claim 1, further comprising dovetails on each end of said main body, one of said dovetails having a male profile and the other of said dovetails having a female profile.

6. The pad of claim 5, wherein said plastic material is glass fiber filled polyurethane.

7. The pad of claim 5, wherein said plastic material is glass fiber filled nylon.

8. The pad of claim 5, wherein said plastic material is rubber filled polypropylene comprising 25% rubber/75% polypropylene by volume.

9. The pad of claim 1, wherein said main body is elongated, and said primary axis is in the direction of elongation.

10. The pad of claim 9, further comprising dovetails on each end of said main body, one of said dovetails having a male profile and the other of said dovetails having a female profile.

11. An injection molded plastic pad for placement between a pipe and a surface supporting the pipe, comprising;

an elongated main body comprising a lattice internal structure, said lattice comprising a plurality of ribs disposed substantially parallel to the direction of the force applied by a pipe being supported, said elongated main body having a convex, closed top surface covering an upper end of said ribs, a lower end of said ribs terminating at a common distance thereby forming an open, substantially flat bottom, wherein said plurality of ribs forms a lattice, comprising ribs which are substantially parallel to said primary axis of said main body, ribs which are substantially perpendicular to said primary axis of said main body, and ribs which are at an acute angle to said primary axis, and wherein said pad further comprises dovetails on each end of said main body, one of said dovetails having a male profile and the other of said dovetails having a female profile.

12. The pad of claim 11, wherein said plastic material is glass fiber filled polyurethane.

13. The pad of claim 11, wherein said plastic material is glass fiber filled nylon.

14. The pad of claim 11, wherein said plastic material is rubber filled polypropylene comprising 25% rubber/75% polypropylene by volume.

* * * * *